(12) United States Patent
Savalle et al.

(10) Patent No.: US 10,965,556 B2
(45) Date of Patent: Mar. 30, 2021

(54) SAMPLING TRAFFIC TELEMETRY FOR DEVICE CLASSIFICATION WITH DISTRIBUTED PROBABILISTIC DATA STRUCTURES

(71) Applicant: Cisco Technology, Inc., San Jose, CA (US)

(72) Inventors: Pierre-André Savalle, Rueil-Malmaison (FR); Jean-Philippe Vasseur, Saint Martin D'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 16/170,567

(22) Filed: Oct. 25, 2018

(65) Prior Publication Data

US 2020/0136937 A1    Apr. 30, 2020

(51) Int. Cl.
| | | |
|---|---|---|
| *H04L 12/26* | (2006.01) | |
| *G06F 16/28* | (2019.01) | |
| *G06N 20/00* | (2019.01) | |
| *H04L 12/813* | (2013.01) | |
| *H04L 29/08* | (2006.01) | |

(52) U.S. Cl.
CPC ............ *H04L 43/04* (2013.01); *G06F 16/289* (2019.01); *G06N 20/00* (2019.01); *H04L 43/065* (2013.01); *H04L 47/20* (2013.01); *H04L 67/12* (2013.01)

(58) Field of Classification Search
CPC ......... H04L 43/04; H04L 47/20; H04L 67/12; G06F 16/289; G06N 20/00
See application file for complete search history.

(56) References Cited

U.S. PATENT DOCUMENTS

| | | | |
|---|---|---|---|
| 8,095,635 B2 | 1/2012 | Wang et al. | |
| 8,311,956 B2* | 11/2012 | Sen | G06N 20/20 706/12 |
| 8,639,837 B2* | 1/2014 | Li | H04L 47/2433 709/236 |
| 9,105,178 B2 | 8/2015 | Carlson | |
| 9,491,039 B2 | 11/2016 | Chen | |
| 9,753,796 B2 | 9/2017 | Mahaffey et al. | |

(Continued)

FOREIGN PATENT DOCUMENTS

EP    3382960 A2    3/2018

OTHER PUBLICATIONS

European Search Report dated Jan. 22, 2020 in connection with European Application No. 19204071.5.

*Primary Examiner* — Mohamed A. Wasel
(74) *Attorney, Agent, or Firm* — Behmke Innovation Group; Kenneth J. Heywood; Jonathon P. Western

(57) ABSTRACT

In one embodiment, a network element in a network maintains a probabilistic data structure indicative of devices in the network for which telemetry data is not to be sent to a device classification service. The network element detects a traffic flow sent from a source device to a destination device. The network element determines whether the probabilistic data structure includes entries for both the source and destination devices of the traffic flow. The network element sends flow telemetry data regarding the traffic flow to the device classification service, based on a determination that the probabilistic data structure does not include entries for both the source and destination of the traffic flow.

17 Claims, 11 Drawing Sheets

(56) References Cited

U.S. PATENT DOCUMENTS

| | | |
|---|---|---|
| 9,979,675 B2 | 5/2018 | Patil et al. |
| 10,003,541 B2* | 6/2018 | Adams .................. H04L 43/026 |
| 10,176,438 B2* | 1/2019 | Shakarian .............. G06N 5/025 |
| 2005/0041583 A1* | 2/2005 | Su .......................... H04L 45/00 370/235 |
| 2007/0076606 A1* | 4/2007 | Olesinski .............. H04L 41/147 370/230 |
| 2010/0014420 A1* | 1/2010 | Wang .................... H04L 41/142 370/229 |
| 2011/0040706 A1* | 2/2011 | Sen ........................ G06N 20/00 706/12 |
| 2011/0280145 A1* | 11/2011 | Itoh ........................ H04L 12/42 370/252 |
| 2015/0341827 A1* | 11/2015 | Bae ....................... H04W 28/10 370/235 |
| 2017/0279829 A1 | 9/2017 | Vasseur et al. |
| 2018/0375773 A1* | 12/2018 | Gobriel .............. H04L 61/2046 |

\* cited by examiner

US 10,965,556 B2

SAMPLING TRAFFIC TELEMETRY FOR DEVICE CLASSIFICATION WITH DISTRIBUTED PROBABILISTIC DATA STRUCTURES

TECHNICAL FIELD

The present disclosure relates generally to computer networks, and, more particularly, to sampling traffic telemetry for device classification with distributed probabilistic data structures.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
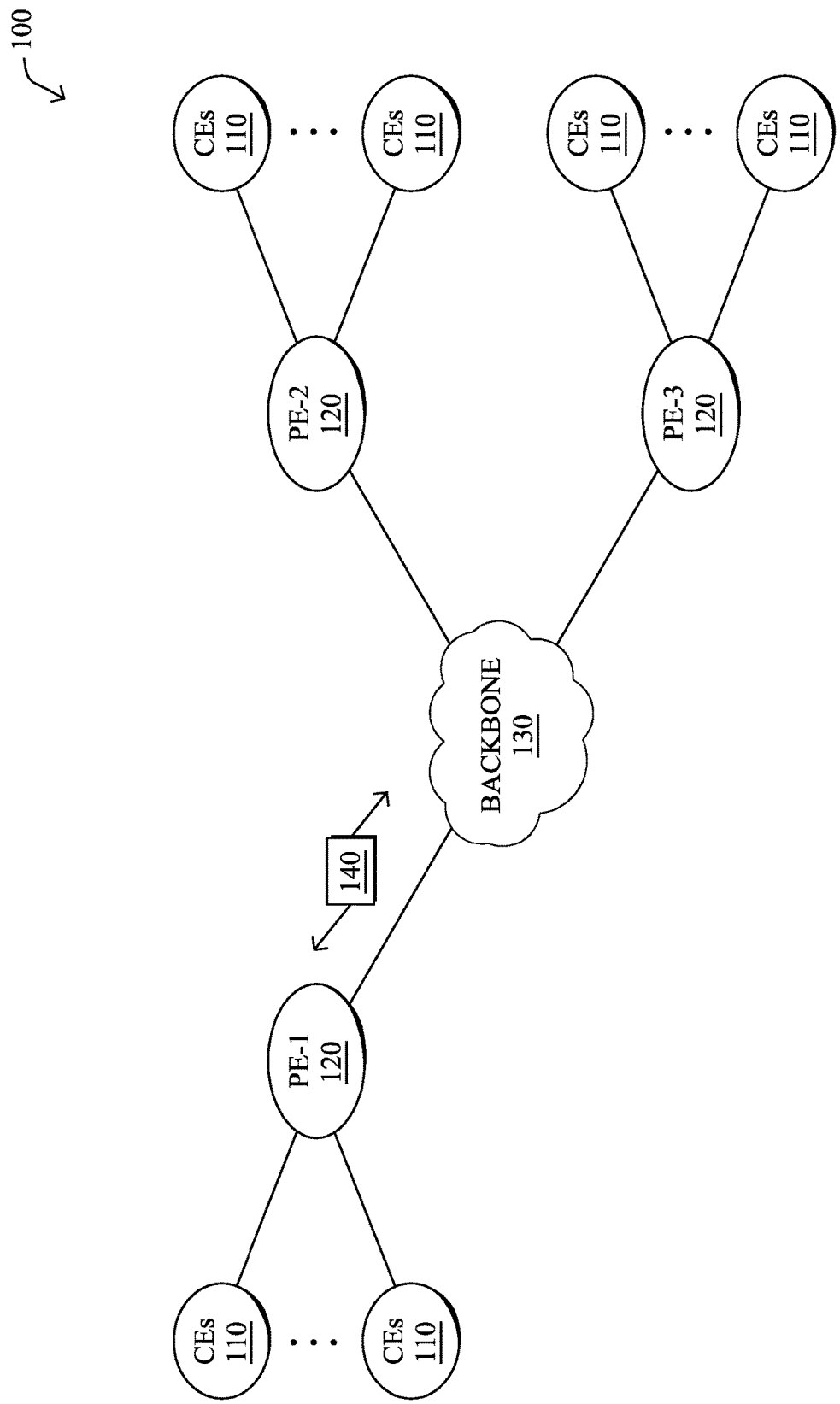
FIGS. 1A-1B illustrate an example communication network.

According to one or more embodiments of the disclosure, a network element in a network maintains a probabilistic data structure indicative of devices in the network for which telemetry data is not to be sent to a device classification service. The network element detects a traffic flow sent from a source device to a destination device. The network element determines whether the probabilistic data structure includes entries for both the source and destination devices of the traffic flow. The network element sends flow telemetry data regarding the traffic flow to the device classification service, based on a determination that the probabilistic data structure does not include entries for both the source and destination of the traffic flow.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B 1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
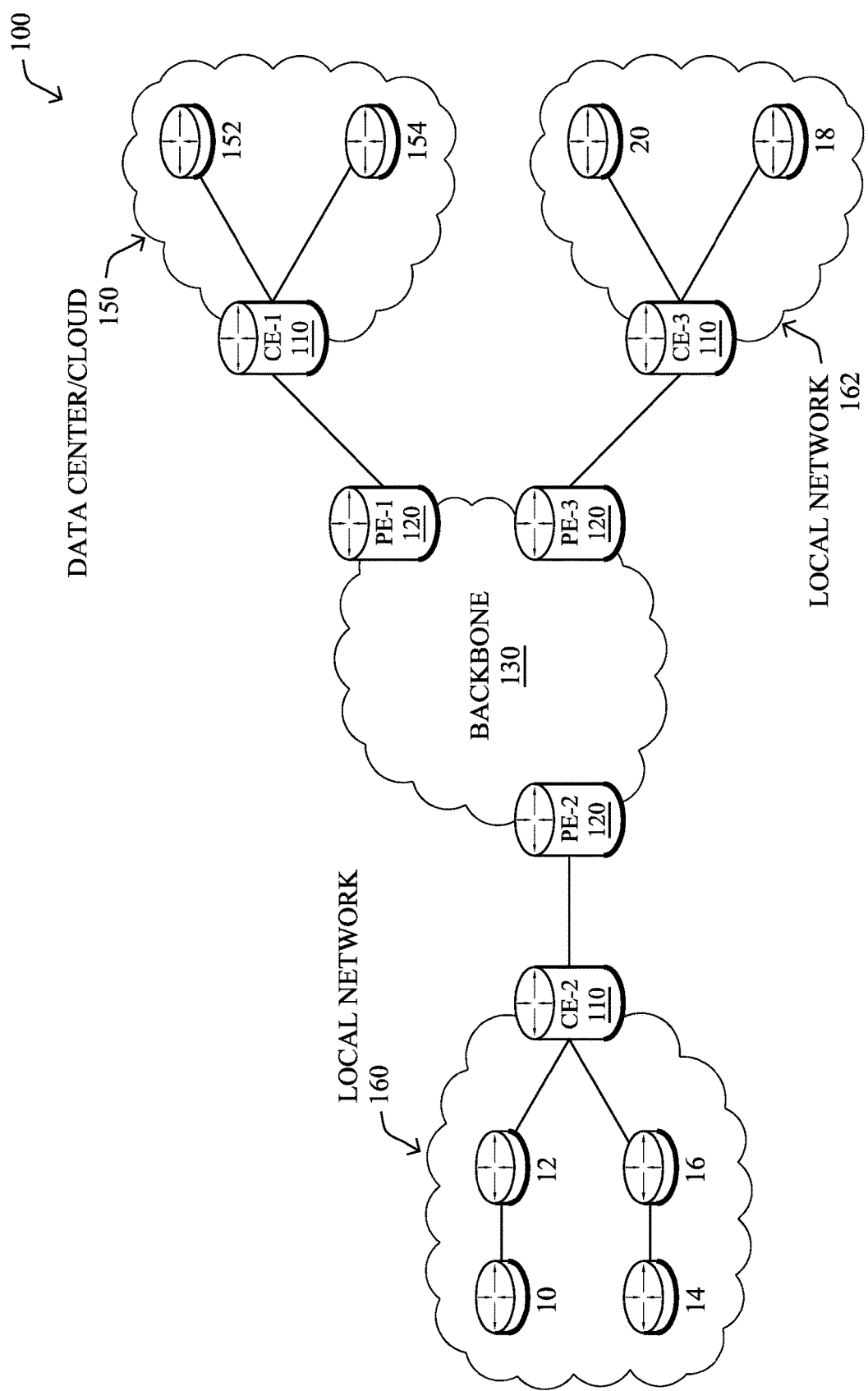

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
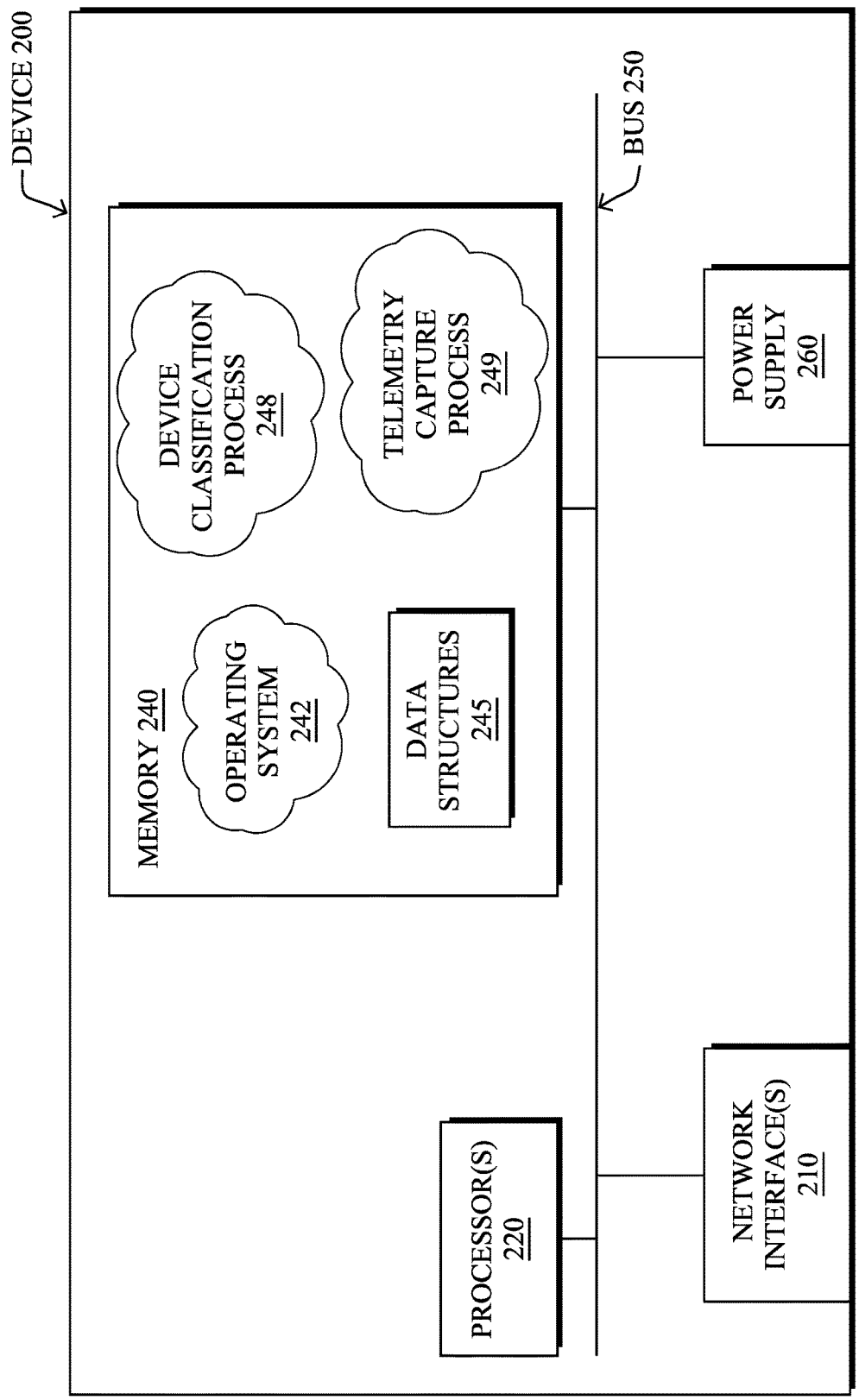
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a telemetry capture process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
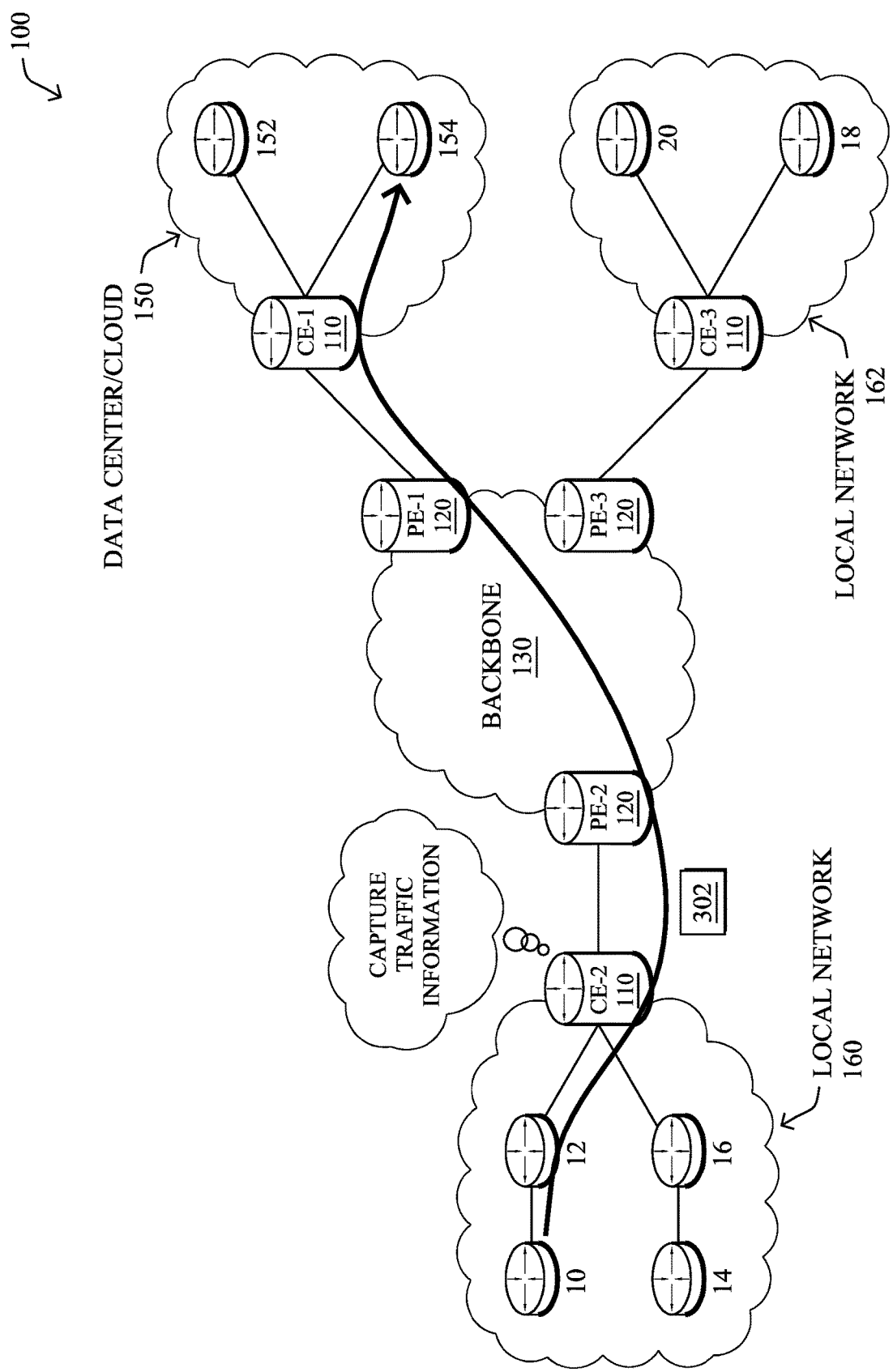
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, device classification is an essential function to support the ever-growing number and types of devices that may join a computer network. One challenge, however, is the capture and reporting of traffic telemetry data to a device classification service for analysis. Notably, the sheer volume of telemetry data that could be captured and reported may exceed the available resources of the network, potentially overloading the network and impacting data traffic. In other words, it is simply not feasible to capture and report all telemetry data possible for purposes of device classification, in many network deployments.

Sampling Traffic Telemetry for Device Classification with Distributed Probabilistic Data Structures The techniques herein introduce a mechanism for the collection of telemetry data for consumption by a device classification service. In some aspects, the telemetry reporting mechanism leverages a probabilistic approach, to determine the probability of selecting a device and start collecting telemetry. In further aspects, the telemetry reporting mechanism may further control the reporting, based on the nature of telemetry, volume of data, duration of data collection according to the confidence of classification, nature of the device (risk level), policy, to dynamically activate the telemetry data reporting from devices in the network. In another aspect, the techniques herein also allow for the enforcement of certain maximum budgets for the volume of reported telemetry data sent to the classification service per time period.

In various embodiments, the techniques herein can be applied equally to both centralized and distributed sampling. In some cases, the telemetry data can be sent to a centralized point in the network and subsampled there. The subsampled telemetry can then be used for classification locally or sent to remote (e.g., cloud-based) components for further processing. However, the techniques herein can also be used to sample closer to the network edge, such as directly on the network elements producing the telemetry data. This reduces the overall telemetry traffic and resource usage in the network. Doing so is also useful in the case of asymmetric network deployments where flows for a given device can be observed at multiple network elements.

Specifically, according to one or more embodiments of the disclosure as described in detail below, a network element in a network maintains a probabilistic data structure indicative of devices in the network for which telemetry data is not to be sent to a device classification service. The network element detects a traffic flow sent from a source device to a destination device. The network element determines whether the probabilistic data structure includes entries for both the source and destination devices of the traffic flow. The network element sends flow telemetry data regarding the traffic flow to the device classification service, based on a determination that the probabilistic data structure does not include entries for both the source and destination of the traffic flow.

Illustratively, the techniques described herein may be performed by hardware, software, and/or firmware, such as in accordance with the telemetry capture process 249, which may include computer executable instructions executed by the processor 220 (or independent processor of interfaces 210) to perform functions relating to the techniques described herein, e.g., in conjunction with device classification process 248.

Figure 4:
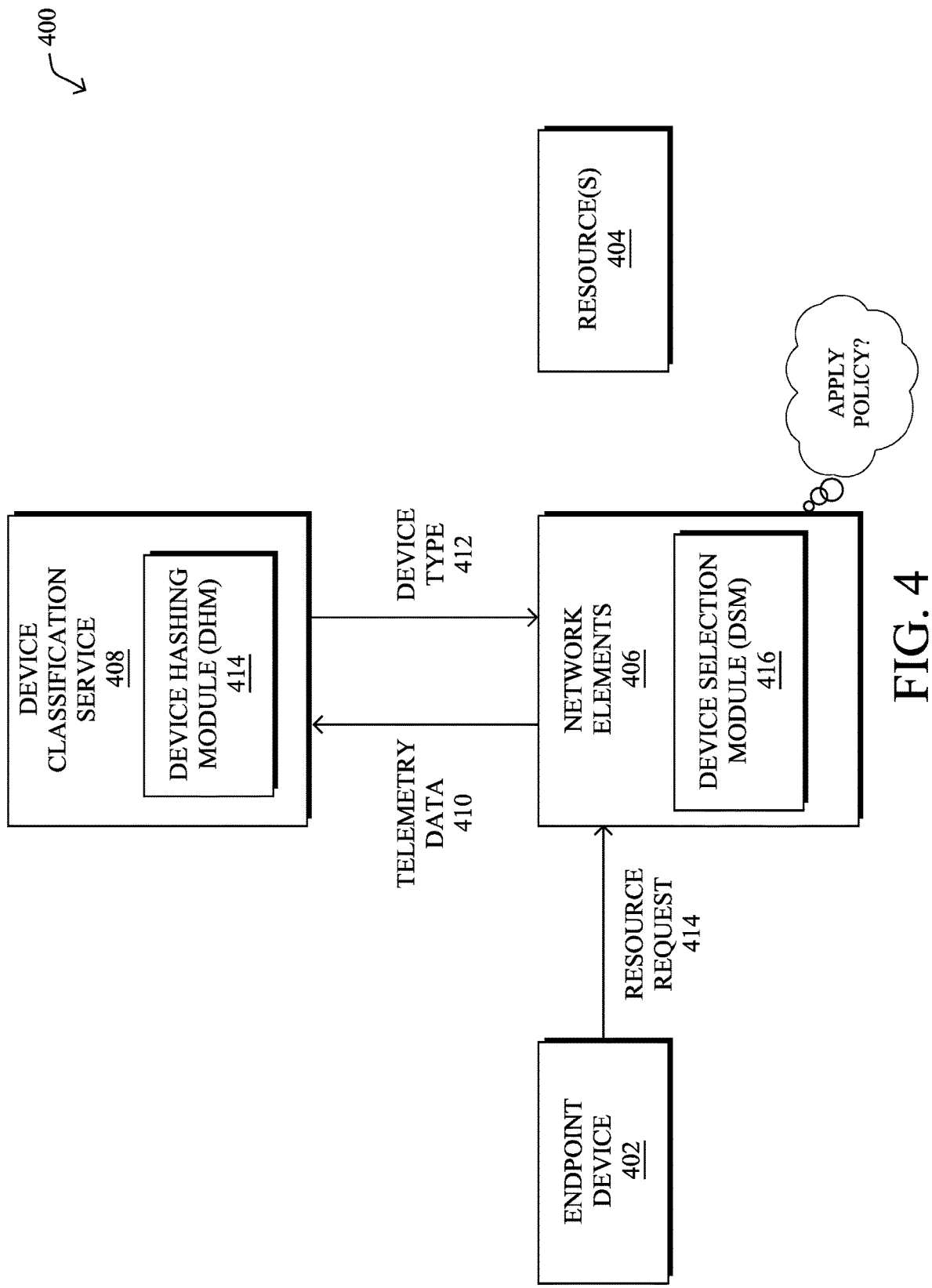
FIG. 4 illustrates an example of a device classification service in a network.

Operationally, FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) polices, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. For example, device type classification can be achieved by using active and/or passive probing of devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021. Accordingly, in various embodiments, device classification service 408 may use machine learning to train and update a machine learning-based classifier able to learn and classify new devices types that a network may encounter.

In general, the techniques herein introduce the following sub-sampling strategy to report telemetry data 410 to device classification service 408 for ingestion:

Whenever a device is seen for the first time (e.g., as identified by a primary key such as a MAC or IP), report telemetry data for that device for a fixed duration of time (e.g., one hour, etc.). This includes all traffic, flows, or packet data that has the device as one of its endpoints. For example, if device 402 is new to the network and of a type not previously seen, network element(s) 406 may send telemetry data 410 for traffic involving endpoint device 402 for a set observation window to device classification service 408.

Once the initial observation period has elapsed, telemetry data for that device can be dropped for a much longer duration (e.g., 6 hours, one or more days, etc.). For example, after the initial observation period, network element(s) 406 may stop sending telemetry data 410 to device classification service 408 for a period if time.

Once the longer time period has elapsed, the traffic is eligible to have its telemetry data reported again to the device classification service. For example, after stopping the reporting of telemetry data 410 regarding device 402 to device classification service 408 for six hours, telemetry data 410 may again be eligible for reporting.

MAC addresses may be preferable as keys to represent different devices, although IPs can be used as well, in further embodiments. However, using IP addresses may risk that a given IP address is placed back in a pool of available IP addresses and reassigned to another device. Of course, this could be mitigated through appropriate DHCP settings or the like. As would be appreciated, the reporting mechanism introduced herein guarantees that all traffic for a given device is seen and reported during a given time period.

In one embodiment, a naïve implementation of the techniques herein would maintain lists of all the devices currently active, as well as all of the devices currently ignored, along with corresponding timestamps. However, this poses multiple issues:

Storing the full list of IPs can require a lot of memory. In addition, it can be very fragile and lacks robustness. For instance, scans or traffic patterns involving a lot of IPs may require a lot of memory (e.g., retail stores may see a large amount of ephemeral MACs or IPs, etc.).

Looking up IPs must be very fast and storing everything requires the development of fast lookup methods. While this may be possible, in some cases, doing so may also require memory to make the lookups fast enough.

This approach also does not operate in a distributed manner, meaning that each network element will need to maintain its own records.

Instead, in further embodiments, the techniques herein propose using probabilistic data structures, to control the telemetry data reporting process and potentially in a distributed manner. Various probabilistic data structures exist that may be suitable for this purpose, many of which have varying characteristics. In general, of the various forms of probabilistic data structures:
  Most support merging
  Some support infinite streams better than others
  Some support counting (e.g., Cuckoo filters or Counting Bloom filters)
  Some support deleting (e.g., Cuckoo filters)
  Some support forgetting (e.g., Stable Bloom filters or A2 Bloom filters, or combining multiple Bloom or Cuckoo filters)

The following mechanisms can be adapted based on the data structures available in the implementation environment, be they Cuckoo filters, Bloom filters, or the like. In a preferred embodiment, the probabilistic data structure selected for use in the network supports some form of forgetting, as well as deleting and merging operations.

In various embodiments, one primary component of the techniques herein is a software module present on network elements 406 and/or on device classification service 408 that is responsible for downsampling flow records. To better understand this, assume that every device D seen on the network can be described by a set of key-value pairs that indicate the attributes of the device. These key-value pairs constitute the telemetry data 410 that can be pushed to device classification service 408. In turn, service 408 may use the received telemetry data 410 for purposes of identifying the device type of the device and/or for building a training dataset from which service 408 trains its classification model(s).

As shown, device classification service 408 may include a device hashing module (DHM) 414 that builds a frequency table of every device in the dataset, in various embodiments. In its simplest embodiment, DHM 414 may produce a hash table that maps every device, as represented by its underlying attributes, to a frequency of occurrence in the dataset. In this case, the hashing algorithm is merely used as a way to compress the representation of devices. Importantly, the hashing function shall be somewhat robust to minor changes in the underlying attributes. For instance, if the key, 'Manufacturer,' has the value 'Apple,' for a device D1 and a value of 'Apple Inc.' for a device D2, but all other fields are identical, D1 and D2 should have the same hash. DHM 414 may use different techniques to achieve this effect, ranging from handcrafted normalization prior to the hashing, to the use of feature extraction techniques, such as term frequency-inverse document frequency (TF-IDF), in order to build a normalized vocabulary. In yet another embodiment, DHM 414 can use a counting Bloom filter, to achieve extremely compressed representations of the frequency table.

In further embodiments, a device selection module 416 may be executed on-premise (e.g., on one or more of network elements 406, a device in communication therewith, etc.) to select devices for which telemetry data should be forwarded to device classification service 408 based on the frequency table constructed by DHM 414. During operations, DSM 416 may evaluate every new device seen on the network by applying the same hashing technique as DHM 414 and therefore recover the frequency of occurrence of the device. In general, the higher the frequency of a device, the lower the probability that it will be selected by DSM 416. Indeed, the scarcest devices are those that have the most value from a learning perspective. In some embodiments, DSM 416 may base its decision to select a device for telemetry reporting based on other parameters, such as the amount of bandwidth used in the past for telemetry data reporting (e.g., so as not to consume more than a threshold amount of network resources for telemetry reporting).

Upon receiving telemetry data for a new device, DHM 414 may update the frequency table and push the updated version to the DSMs 416 in any number of monitored networks.

In one embodiment, DSM 416 may also be used to specify the type of telemetry data that is to be reported (e.g., types of data sources, etc.). The types of telemetry data, as noted above, can range from packet captures (PCAP), to Netflow or other flow records, or the like, that may be explicitly requested by device classification service 408. In yet another embodiment, the telemetry data may first start with more granular data while, as time goes by, less granular data may be captured for the device under scrutiny. Note that the first packets sent by a new device are likely to be strong indicator of the nature of the device, while granular data collection strategies may be used in a second step of telemetry collection.

DSM 416 and/or DHM 414 may also specify different durations for the telemetry data collection which can be governed by various factors such as a confidence measurement for the device type classifier of device classification service 408, the nature of the device (e.g., risk level), or the like. For example, if endpoint device 402 belongs to a device category flagged as "high risk," the capture of its telemetry data 410 by network element(s) 406 may be for a longer time period than for another endpoint device that is in a lower risk category. In yet another embodiment, DSM 416 may make use of a user-defined policy that specifies the telemetry data collection and reporting window for devices that are of an unknown type.

In general, a flow record is supposed to include a source primary key and a destination primary key. Usually, these will be source IP and destination IP, but could also be the MAC addresses of these devices or other device identifiers.

Figure 5:
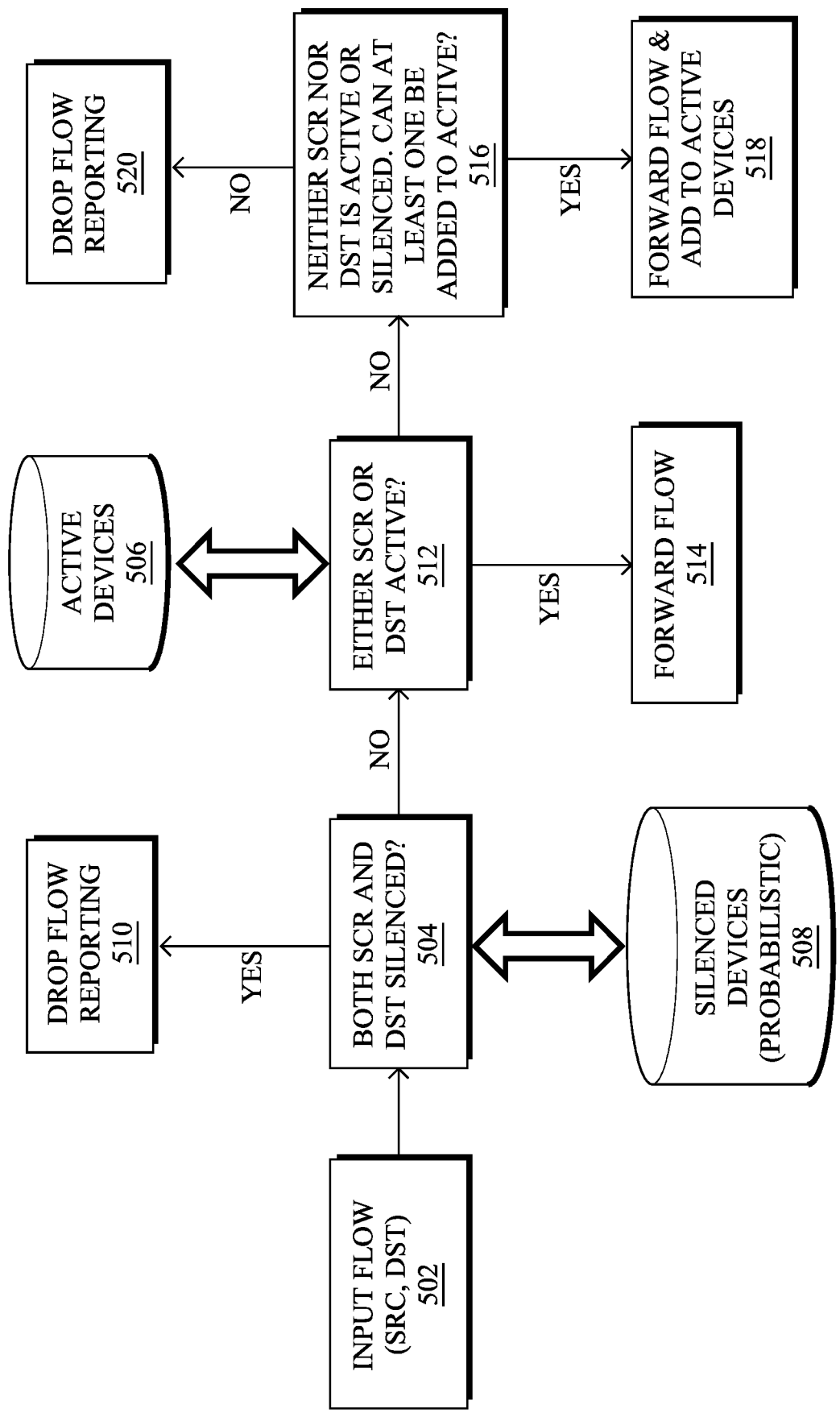
FIG. 5 illustrates an example flow diagram of selective telemetry reporting.

FIG. 5 illustrates an example flow diagram 500 of selective telemetry reporting, according to various embodiments. As shown, the device(s) implementing the techniques herein may maintain two data structures:

A first data structure 506 that includes entries indicative of "active devices" for which telemetry data should be collected and sent to the device classification service. In addition, this data structure may also indicate other information, such as when the device was first observed in the network, when telemetry data for the device was first forwarded, etc. For a given flow, telemetry data regarding the flow may only be forwarded if, and only if, at least one of the source or destination of the flow has an entry in the active devices data structure. By design, there may be a limit as to the number of device entries allowed at any given time in the active devices data structure. In some cases, this data structure can also be a probabilistic data structure, but doing so would increase the complexity of the techniques herein considerably.

A second data structure 508 that includes entries indicative of "silenced devices" and is a probabilistic data structure, in various embodiments. This data structures may include, for example, all of the IPs or other device identifiers that have been active for a configurable amount of time or recorded flows and have since been moved to the "silenced devices" data structure. During operation, a flow that has both endpoints silenced does not have its telemetry data sent to the classification service, in one embodiment. Note that there may be many silenced devices at any given time, but a space-efficient probabilistic data structure could be used.

Thus, when a new flow is processed (block 502), the processing device may determine whether both the source (src) and destination (dst) of the flow are silenced (block 504). In other words, the processing network element may check whether the source and destination of the flow each have entries in the silenced devices data structure 508. If so, then the element may drop the flow for purposes of reporting its telemetry to the device classification service. Note that this could entail either not forwarding already collected telemetry data or, alternatively, not sending the flow on for sampling.

If one of the endpoints of the flow is not silenced, or if neither are, the processing network element may then determine whether either is active (block 512). Notably, the element may determine whether either the source or destination has an entry in the active devices data structure 506. If so, the network element may forward the flow (e.g., or flow telemetry data) on to the device classification service.

If neither the source, nor destination of the flow, has an entry in either of data structures 506-508, this means that the device is newly observed in the network. In such a case, the network element may attempt to add at least one of the two to the active devices data structure 506, based on any number of conditions. For example, as noted, active devices data structure 506 may have a predefined maximum number of devices that it can contain at any given time. If this limit has not been met, and if any other conditions have also been satisfied, the element may forward the flow data on to the device classification service and add an entry to active devices data structure 506 for at least one of the two endpoints of the traffic flow (block 518). Conversely, if the active devices data structure 506 is currently full, the processing element may drop the flow reporting of the flow to the device (block 520).

Note that the maximum size of the active device data structure 506 is important, as this data structure is not space-efficient. By first checking silenced devices data structure 508 first, this allows most of the processing to be fast-tracked, dropping the reporting for most traffic.

In some embodiments, the network element may also employ a garbage collection mechanism whereby device entries in active devices data structure 506 are moved to silenced devices data structure 508 over time. For example, if an active device has been active for more than configurable amount of time, or has seen more than a configurable number of flows, it may be removed from the list of active devices, and add to the silenced devices. In addition, the probabilistic data structure of silenced devices data structure 508 may implement some sort of forgetting, so that devices added to the silenced list are eventually removed from the structure.

In some embodiments, the network element responsible for sampling and/or reporting telemetry data to the device classification service may also employ a configurable reporting budget, to control when and what is reported. For example, such budget parameters may define the number of flows per time period (e.g., minute, hour, etc.) for a particular device that may be sent to the service, the overall amount of telemetry traffic to be sent, or the like. In one embodiment, the budget may be static while, in another embodiment, the budget may vary with time and type of devices as already pointed out. However, such a reporting budget may also be governed by the set of available resources on the network. Indeed, one of the key challenges in telemetry being sent to the cloud lies in the volume of data. Although probabilistic approaches and down sampling can be used to optimize such approaches, a cap can also be set on the budget according to the available resources in the network (e.g. saturation of the WAN link, etc.).

Figure 6A:
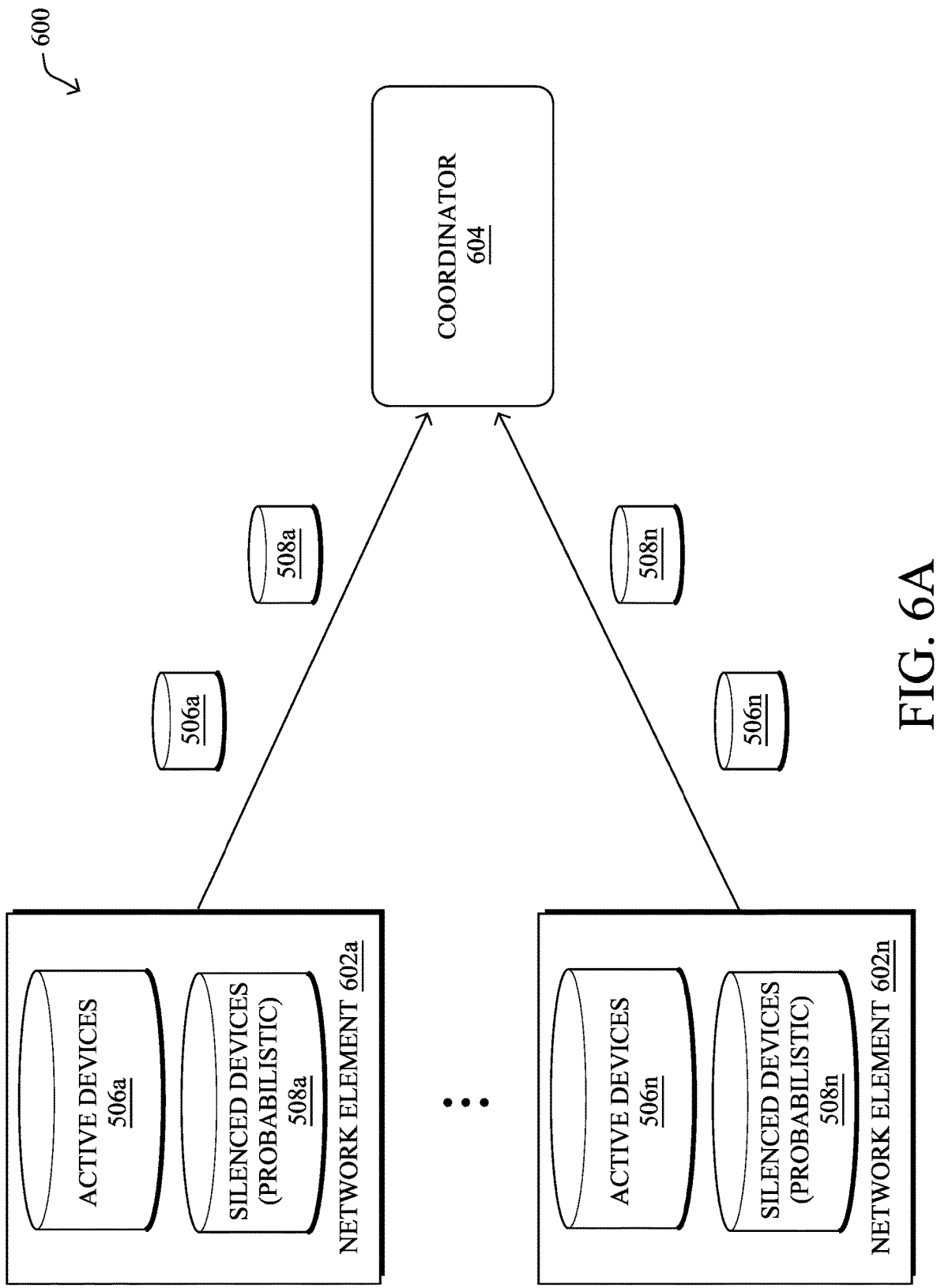
FIGS. 6A-6C illustrate an example of the merging of telemetry reporting data structures.
Figure 6B:
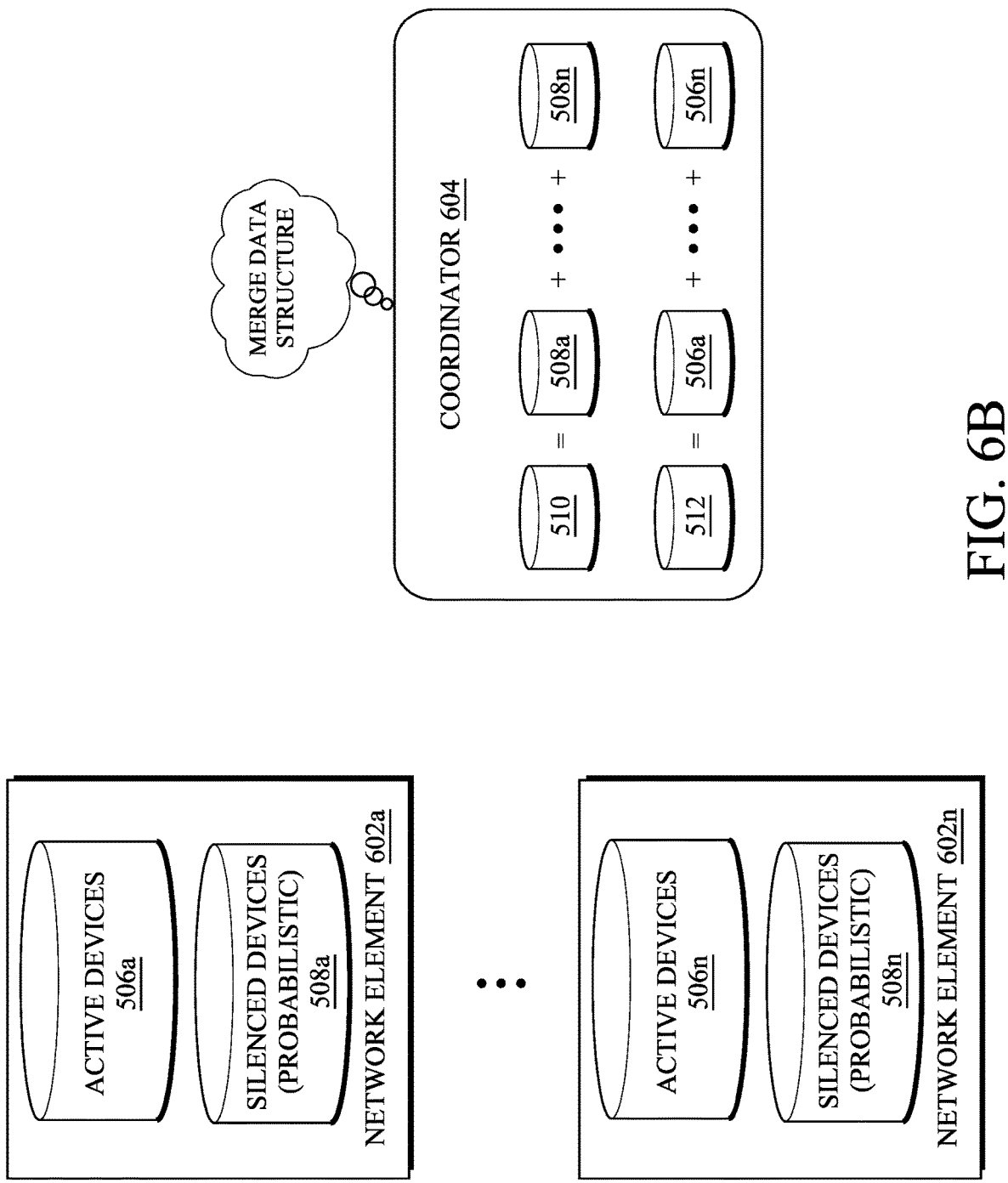
Figure 6C:
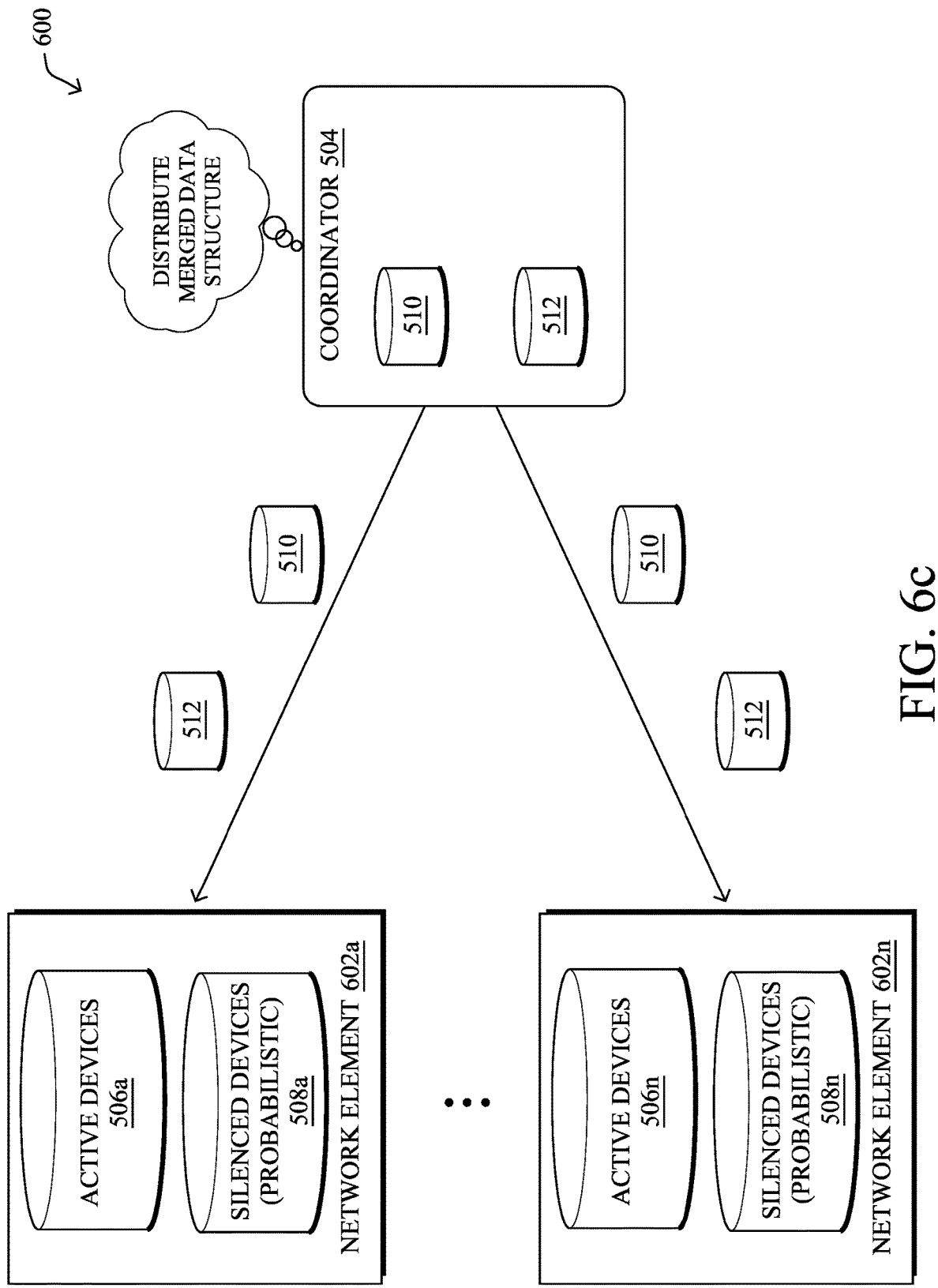

Another optional mechanism introduced herein coordinates down sampling from multiple distributed instances of the mechanism shown in FIG. 5. For example, FIGS. 6A-6C illustrate an example 600 of the merging of telemetry reporting data structures. As shown, assume that there are any number of network elements 602 (e.g., a first through $n^{th}$ network element), each of which may employ the techniques described with respect to FIG. 5. In particular, each network element 602 shown may maintain its own active devices data structure 506 and a probabilistic, silent devices data structure 508.

In some embodiments, as shown in FIG. 6A, to propagate the local data structure(s) 506 and/or 508 of a network element 602 to another network element 602, the network element may send its data structure(s) to a coordinator 604. For example, coordinator 604 may be the device classification service itself or another service that operates in conjunction therewith.

As shown in FIG. 6B, in response to receiving data structures 506 and/508 from network elements 602, coordinator 604 may merge the received data structures. For example, coordinator 604 may merge the received active devices data structures 508 into a merged active devices data structure 512. Similarly, coordinator 604 may merge the silenced devices data structures 508 into a merged silenced devices data structure 510.

In FIG. 6C, once coordinator 506 has formed the merged data structures 510 and/or 512, it may propagate the merged data structures to the network elements 602. In turn, a receiving network element 602 may replace its corresponding local data structure with the merged data structure. Once replaced, the network element 602 may begin using the merged data structure(s) for purposes of making telemetry reporting decisions, as detailed above.

Figure 7:
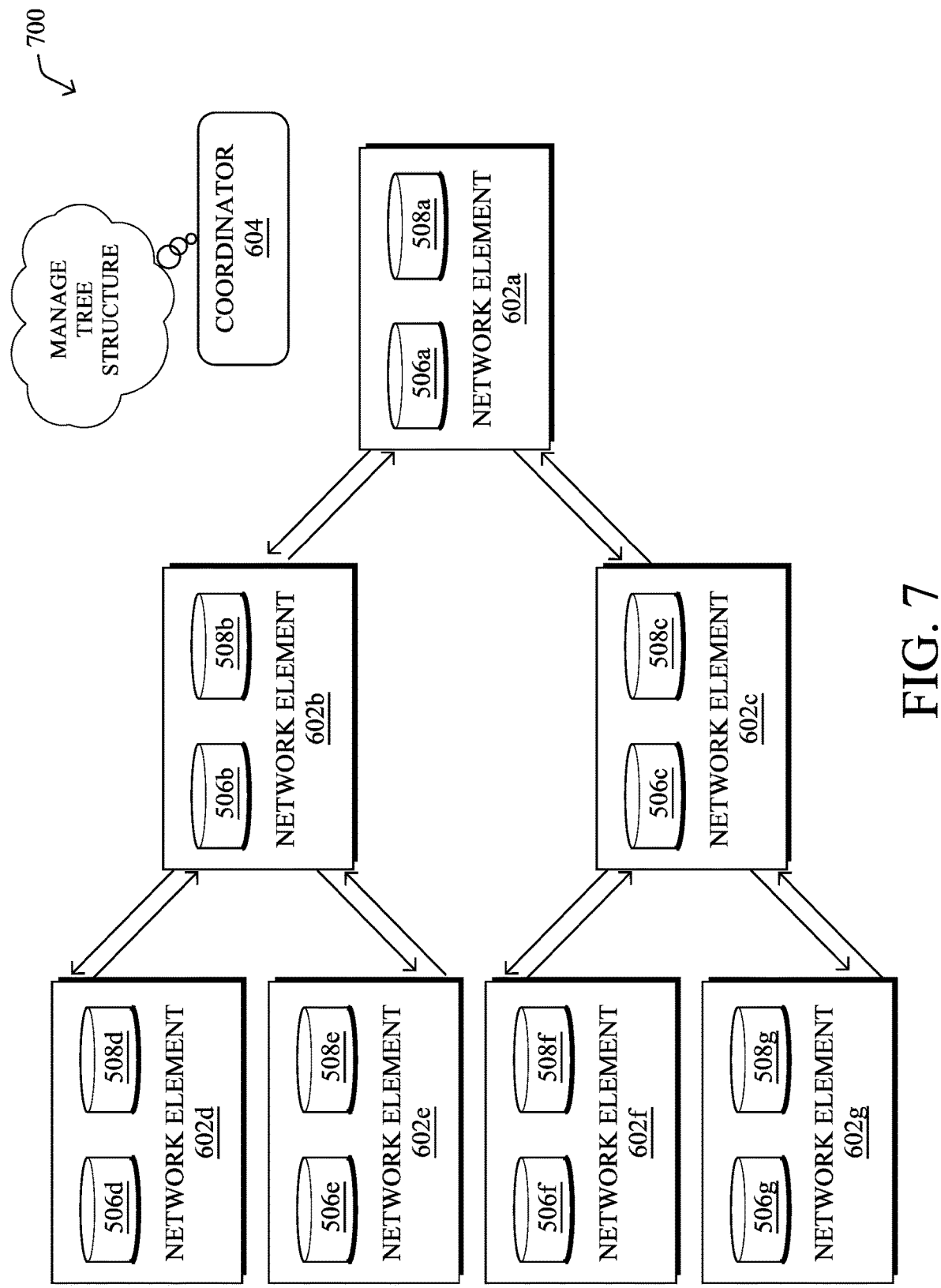
FIG. 7 illustrates an example of distributed coordination of telemetry reporting.

Alternatively, in another embodiment, the network elements themselves may take on some of the responsibility of propagating the data structures. For example, FIG. 7 illustrates an example 700 of distributed coordination of telemetry reporting. As shown, assume that there are network elements 602a-602g in the network, each of which maintains its own data structures 506-508. In this embodiment, coordinator 604 may construct and propagate the tree structure to elements 602 via which the elements share and merge their data structures. With N network elements, to avoid about 2*N messages going in and out of the elements 602, coordinator 604 may employ techniques such as MPI Allreduce, which builds up a tree of nodes, and has nodes pass messages up and down the tree, in order to merge their data structures.

Regardless of whether a centralized merging or distributed merging approach is taken, the messages involved are considerably lightweight, because the data structures involved are compressed and space-efficient by design. In some embodiments, only the silenced devices data structures may be shared, so as to reduce communications and limit inconsistencies. Further, the frequency at which messages are exchanged can be configured based on the amount of network traffic, and on the other parameters of the system (e.g., the eviction policy for active device or the forgetting parameters for the silenced devices).

In yet another embodiment, multicast trees can be used, to optimize the telemetry gathering. The deeper the device selection module (DSM) is executed in the network (e.g., farther away from the edge), the more likely all devices seen on the network will be detected and classified. For example, consider the case of an attacking device performing lateral moves at the edge of the network. Unfortunately, not all network elements may be equipped with storage and processing power to implement the proposed techniques. Consequently, DSM models may be activated in places in the network where such capabilities are supported, which could be dynamically discovered thanks to IGP routing extensions advertising node capabilities. In yet another embodiment, a node running out of processing power may dynamically deactivate such functionality, leaving the responsibility of data gathering to "upper" nodes in the network at the risk of missing the new device.

Figure 8:
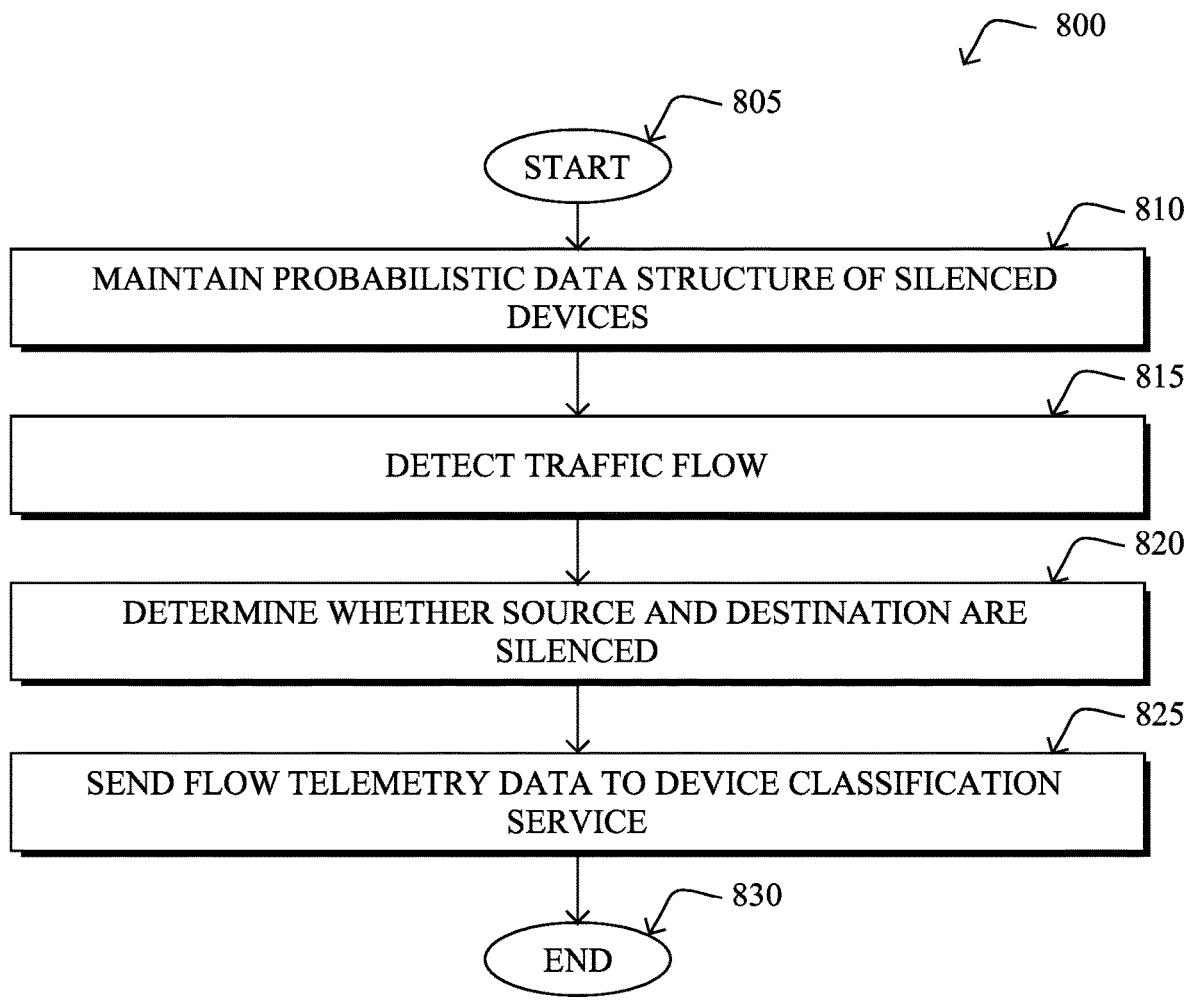
FIG. 8 illustrates an example simplified procedure for sending flow telemetry data to a device classification service.

FIG. 8 illustrates an example simplified procedure for sending flow telemetry data to a device classification service, in accordance with one or more embodiments described herein. For example, a non-generic, specifically configured device (e.g., device 200) may perform procedure 800 by executing stored instructions (e.g., process 248 and/or 249). Such a device may be, in some embodiments, a network element (e.g., a router, switch, Netflow flow exporter, etc.). The procedure 800 may start at step 805, and continues to step 810, where, as described in greater detail above, the network element may maintain a probabilistic data structure indicative of devices in the network for which telemetry data is not to be sent to a device classification service. Any number of probabilistic data structures may be used such as, but not limited to, various forms of Bloom filters or Cuckoo filters.

At step 815, as detailed above, the network element may detect a traffic flow sent from a source device to a destination device. As would be appreciated, any number of traffic characteristics may be extracted from the flow by the network element. For example, the element may assess the header information of the flow packets, perform DPI on the payload of the packets, capture copies of the packets themselves, or the like.

At step 820, the network element may determine whether the probabilistic data structure includes entries for both the source and destination devices of the traffic flow, as described in greater detail above. Notably, in various embodiments, if both the source and destinations of the traffic flow are "silenced" for purposes of reporting, as indicated by the probabilistic data structure, the network element may determine that flow telemetry reporting regarding the flow to the device classification service is not needed.

At step 825, as detailed above, the network element may send flow telemetry data regarding the traffic flow to the device classification service, based on a determination that the probabilistic data structure does not include entries for both the source and destination of the traffic flow. In some embodiments, the element may also determine whether an entry exists in an active device data structure that lists the devices for which telemetry data should be forwarded. If an entry exists for either the source or destination of the flow, and neither is silenced, the element may forward telemetry data to the service. Otherwise, if neither data structure includes an entry for either the source or destination, the element may determine whether ether should be added to the active device data structure based on any number of rules (e.g., a size limit on the active device list, etc.) and the traffic telemetry reported to the classification service. Procedure 800 then ends at step 830.

It should be noted that while certain steps within procedures 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for sampling traffic telemetry for device classification with distributed probabilistic data structures, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    maintaining, by a network element in a network, a first probabilistic data structure and a second data structure separate from the first probabilistic data structure, wherein the first probabilistic data structure includes entries indicative of devices in the network for which telemetry data is not to be sent to a device classification service, and the second data structure includes entries indicative of devices in the network for which telemetry data is to be sent to the device classification service;
    detecting, by the network element, a traffic flow sent from a source device to a destination device;
    determining, by the network element, whether the first probabilistic data structure includes entries for both the source and destination devices of the traffic flow; and
    when it is determined that the first probabilistic data structure does not include entries for both the source and destination devices of the traffic flow, sending, by the network element, flow telemetry data regarding the traffic flow to the device classification service.

2. The method as in claim 1, wherein the device classification service uses the flow telemetry data as part of a training dataset to train a machine learning-based device classifier.

3. The method as in claim 1, further comprising:
    determining, by the network element, whether the second data structure includes an entry for either of the source or destination devices of the traffic flow, wherein the network element sends the flow telemetry data regarding the traffic flow to the device classification service based in part on a determination that the second data structure includes an entry for either of the source or destination devices of the traffic flow.

4. The method as in claim 1, further comprising:
determining, by the network element, that the second data structure does not include an entry for either the source and destination of the traffic flow; and
adding, by the network element, an entry for the source or destination device to the second data structure, if the second data structure includes less than a threshold number of entries.

5. The method as in claim 1, further comprising:
moving, by the network element, an entry in the second data structure to the first probabilistic data structure after a predefined amount of time has elapsed.

6. The method as in claim 1, further comprising:
sending, by the network element, the first probabilistic data structure to a coordinator; and
receiving, at the network element and from the coordinator, an updated probabilistic data structure that merges the first probabilistic data structure with one or more data structures from one or more other network elements.

7. The method as in claim 1, wherein the entries in the first probabilistic data structure are based on a hash table that maps device types to frequencies of occurrence of telemetry data key-value pairs.

8. The method as in claim 1, further comprising:
when it is determined that the first probabilistic data structure does include entries for both the source and destination devices of the traffic flow, dropping, by the network element, the flow telemetry data regarding the traffic flow.

9. An apparatus, comprising:
one or more network interfaces to communicate with a network;
a processor coupled to the network interfaces and configured to execute one or more processes; and
a memory configured to store a process executable by the processor, the process when executed configured to:
maintain a first probabilistic data structure and a second data structure separate from the first probabilistic data structure, wherein the first probabilistic data structure includes entries indicative of devices in the network for which telemetry data is not to be sent to a device classification service, and the second data structure includes entries indicative of devices in the network for which telemetry data is to be sent to the device classification service;
detect a traffic flow sent from a source device to a destination device;
determine whether the first probabilistic data structure includes entries for both the source and destination devices of the traffic flow; and
when it is determined that the first probabilistic data structure does not include entries for both the source and destination devices of the traffic flow, send flow telemetry data regarding the traffic flow to the device classification service.

10. The apparatus as in claim 9, wherein the device classification service uses the flow telemetry data as part of a training dataset to train a machine learning-based device classifier.

11. The apparatus as in claim 9, wherein the process when executed is further configured to:
determine whether the second data structure includes an entry for either of the source or destination devices of the traffic flow, wherein the network element sends the flow telemetry data regarding the traffic flow to the device classification service based in part on a determination that the second data structure includes an entry for either of the source or destination devices of the traffic flow.

12. The apparatus as in claim 9, wherein the process when executed is further configured to:
determine that the second data structure does not include an entry for either the source and destination of the traffic flow; and
add an entry for the source or destination device to the second data structure, if the second data structure includes less than a threshold number of entries.

13. The apparatus as in claim 9, wherein the process when executed is further configured to:
move an entry in the second data structure to the first probabilistic data structure after a predefined amount of time has elapsed.

14. The apparatus as in claim 9, wherein the process when executed is further configured to:
send the first probabilistic data structure to a coordinator; and
receive, from the coordinator, an updated probabilistic data structure that merges the first probabilistic data structure with one or more data structures from one or more other network elements.

15. The apparatus as in claim 9, wherein the entries in the first probabilistic data structure are based on a hash table that maps device types to frequencies of occurrence of telemetry data key-value pairs.

16. The apparatus as in claim 9, wherein the process when executed is further configured to:
when it is determined that the first probabilistic data structure does include entries for both the source and destination devices of the traffic flow, drop the flow telemetry data regarding the traffic flow.

17. A tangible, non-transitory, computer-readable medium storing program instructions that cause a network element to execute a process comprising:
maintaining, by the network element, a first probabilistic data structure and a second data structure separate from the first probabilistic data structure, wherein the first probabilistic data structure includes entries indicative of devices in the network for which telemetry data is not to be sent to a device classification service, and the second data structure includes entries indicative of devices in the network for which telemetry data is to be sent to the device classification service;
detecting, by the network element, a traffic flow sent from a source device to a destination device;
determining, by the network element, whether the first probabilistic data structure includes entries for both the source and destination devices of the traffic flow; and
when it is determined that the first probabilistic data structure does not include entries for both the source and destination devices of the traffic flow, sending, by the network element, flow telemetry data regarding the traffic flow to the device classification service.

* * * * *